(12) United States Patent
Klenk et al.

(10) Patent No.: US 7,669,456 B2
(45) Date of Patent: Mar. 2, 2010

(54) METHOD AND DEVICE FOR DETERMINING THE REST TIME AND/OR FOR DRIFT COMPENSATION IN A COMBUSTION CHAMBER PRESSURE SENSOR

(75) Inventors: Matthias Klenk, Loechgau (DE); Thomas Walker, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 484 days.

(21) Appl. No.: 11/673,162

(22) Filed: Feb. 9, 2007

(65) Prior Publication Data

US 2007/0192044 A1    Aug. 16, 2007

(30) Foreign Application Priority Data

Feb. 15, 2006  (DE) .................. 10 2006 006 888

(51) Int. Cl.
   *G01L 27/00*    (2006.01)
(52) U.S. Cl. ....................................... 73/1.62
(58) Field of Classification Search ............. None
   See application file for complete search history.

(56) References Cited

FOREIGN PATENT DOCUMENTS

DE      197 49 814      5/1999

*Primary Examiner*—Robert R Raevis
(74) *Attorney, Agent, or Firm*—Michael J. Striker

(57) ABSTRACT

In a method for determining the reset time in a pressure sensor that detects the pressure in a combustion chamber of an internal combustion engine and emits a corresponding pressure signal, with the pressure curve in the combustion chamber having at least one high-pressure region the reset time is determined as a function of at least one pressure value detected in the high-pressure phase, so that it is possible, within the sensor, to determine a favorable time at which to reset the drift, based on the pressure range. In the method, information about the auxiliary rotation speed is determined based on the pressure curve of the compression phase and is then used to generate the reset time, the method entails only slight circuitry-related expense and can therefore be implemented even in an ASIC without complex signal processing, and the method functions in almost all known engine operating states.

7 Claims, 3 Drawing Sheets

METHOD AND DEVICE FOR DETERMINING THE REST TIME AND/OR FOR DRIFT COMPENSATION IN A COMBUSTION CHAMBER PRESSURE SENSOR

CROSS-REFERENCE TO A RELATED APPLICATION

The invention described and claimed hereinbelow is also described in German Patent Application DE 102006006888.2 filed on Feb. 15, 2006. This German Patent Application, whose subject matter is incorporated here by reference, provides the basis for a claim of priority of invention under 35 U.S.C. 119(a)-(d).

BACKGROUND OF THE INVENTION

The invention is based on methods and devices for determining the reset time and/or for drift compensation in a combustion chamber pressure sensor.

A combustion chamber pressure sensor in an internal combustion engine measures the pressure curve in the combustion chamber during operation of the engine. Usually, the piezoelectric or piezoresistive measurement principle is used for the measurement.

During operation, thermal influences generate stresses in the sensor that become apparent in the form of drift. The electronic evaluation of a piezoelectric sensor element is also very susceptible to drift due to leakage currents and insulation resistances. These drifts must be compensated for, either through continuous measurement and adjustment or through time-discrete resetting at a time in which an interference in the measurement signal is irrelevant. In the pressure curve evaluation currently in use, only the high-pressure phase is used (0-360° KW). The resetting time is only permitted to occur after this (360-720° KW); the intake pressure range of (540-720° KW) would be ideal. This ideal resetting time can only be determined in a very imprecise fashion because the combustion chamber pressure sensor does not receive a rotation angle position from the engine control unit and because engine speed and the pressure curve fluctuate sharply during operation.

DE 197 49 814 A1 has disclosed the execution of a correction in conjunction with a reference point in order to eliminate the zero error (drift) of the cylinder pressure sensor or cylinder pressure sensors. The reference point in this case can be a crankshaft angle at which the pressure is approximately known. This is the case, for example, at the TDC charge exchange (TDC=top dead center). In normally aspirated engines, the combustion chamber pressure or cylinder pressure at the TDC charge exchange is approximately equal to the ambient pressure.

SUMMARY OF THE INVENTION

Accordingly, it is an object of the present invention to provide a method and a device which are further improvements of the existing methods and devices of this type.

The present invention is based on a method for determining the reset time in a pressure sensor that detects the pressure in a combustion chamber of an internal combustion engine and emits a corresponding pressure signal. In this connection, the pressure curve in the combustion chamber has at least one high-pressure region (compression region). The essence of the invention is that the determination of the reset time occurs as a function of at least one pressure value detected in the high-pressure phase.

The invention makes it possible, within the sensor, to determine a favorable time at which to reset the drift, based on the pressure range.

In the method according to the invention, information about the auxiliary rotation speed is determined based on the pressure curve of the compression phase and is then used to generate the reset time. The method entails only slight circuitry-related expense and can therefore be implemented even in an ASIC without complex signal processing. It functions in almost all known engine operating states.

In an advantageous embodiment of the invention, the reset time is determined in such a way that during the high-pressure range, a time between two predetermined values of the pressure signal is detected and the reset time is determined as a function of this time.

In this embodiment, the detected time can be multiplied by a factor at an additional time and the reset time can be determined after the pressure signal has reached the second predetermined value and the additional time has expired.

Also in this embodiment, the detected time can be multiplied by a factor at an additional time and the reset time can be determined after the pressure signal has reached the second predetermined value, the additional time has expired, and the pressure signal has fallen below a third value.

The invention also relates to a method for drift compensation of a pressure sensor that detects the pressure in a combustion chamber of an internal combustion engine and emits a corresponding pressure signal, in which the pressure curve in the combustion chamber has at least one high-pressure region (compression region) and a reset time is determined for the drift compensation. With this method, too, the essence of the invention is that the determination of the reset time occurs as a function of at least one pressure value detected in the high-pressure phase.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The invention will be described by way of example in conjunction with the following exemplary embodiment.

As mentioned above, with the method according to the invention, information about the auxiliary rotation speed is determined based on the pressure curve of the compression phase and is then used to generate the reset time. The method entails only slight circuitry-related expense and can therefore be implemented even in an ASIC without complex signal processing. It functions in almost all known engine operating states.

By means of two pressure thresholds (S1 and S2 in FIG. 1), a time signal (t2-t1) is measured during the compression phase, which is approximately reciprocally proportional to the speed of the engine. This time signal (t2-t1) is multiplied by the factor F_mult and, after the second threshold S2, yields the reset time t3.

Figure 1:
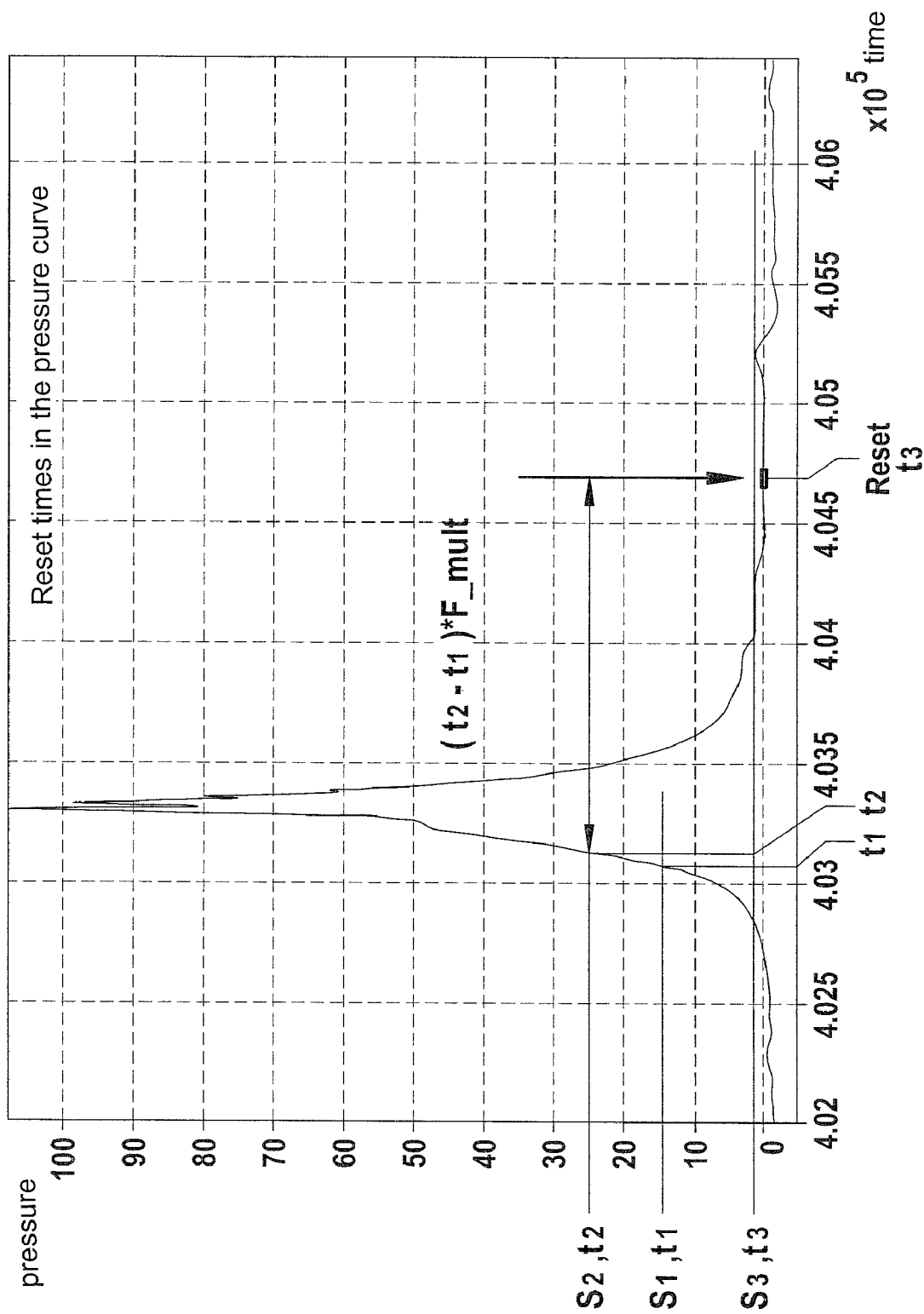
FIG. 1 is a view showing a typical pressure curve over time.

An expanded function is implemented by means of the threshold S3 (see FIG. 1): at the calculated reset time t3, it is necessary to wait until the pressure value p falls below the threshold S3. This prevents a reset from occurring during the high-pressure phase. FIG. 1 shows that at the calculated reset time t3, the pressure has already fallen below the threshold value S3.

By positioning the thresholds S1 and S2 in the compression phase, the approximate speed measurement is independent of the combustion. A speed increase due to the combustion does in fact occur at time F_mult*(t2t1), but if F_mult*(t2t1) is not selected as too high, then the reset time remains within the low-pressure phase. S1, S2, and F_mult are applicable, which makes it possible to adapt to other combustion processes, engines, and installation situations.

The operating sequence is implemented by means of a discrete or integrated circuit (ASIC). If the pressure signal exceeds the threshold S1, then a counter is started at zero. The counter stops when the threshold S2 is reached. The counter reading is multiplied by the factor F_mult. After the threshold S2 is reached, the counter starts at the newly calculated counter reading and counts backwards to zero, whereupon it triggers the reset.

As an option or another embodiment of the invention, a threshold S3 can be provided. At the time of the reset, a check is run as to whether the pressure has fallen below the threshold S3. If this is the case, then the reset is executed. But if the pressure has not fallen below the threshold S3, then the reset is delayed until the threshold S3 is reached. This operating sequence can be executed in a hardware-based or software-based fashion.

With the reset at time t3, the measurement value of the pressure sensor at that moment is set to a definite value, in particular to the value "0". This achieves a drift compensation.

The use of the invention can also have the following effect on the output signal of the pressure sensor: with a drift, in particular one of significant magnitude, small compensation steps occur in the output signal at the reset time.

Figure 2:
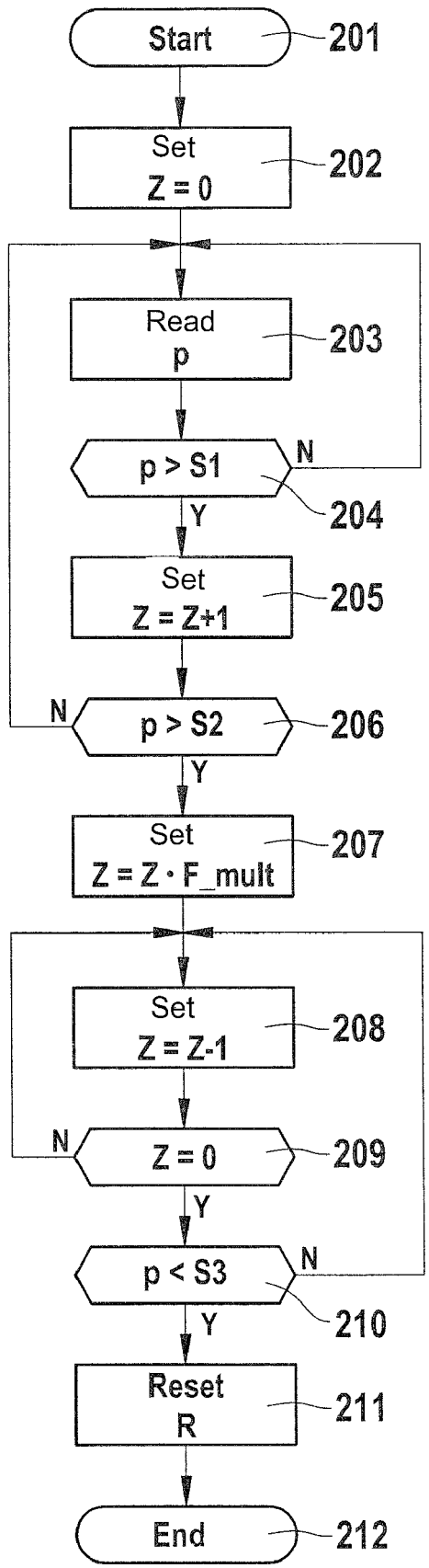
FIG. 2 is a view showing shows a flow chart of the process.
Figure 3:
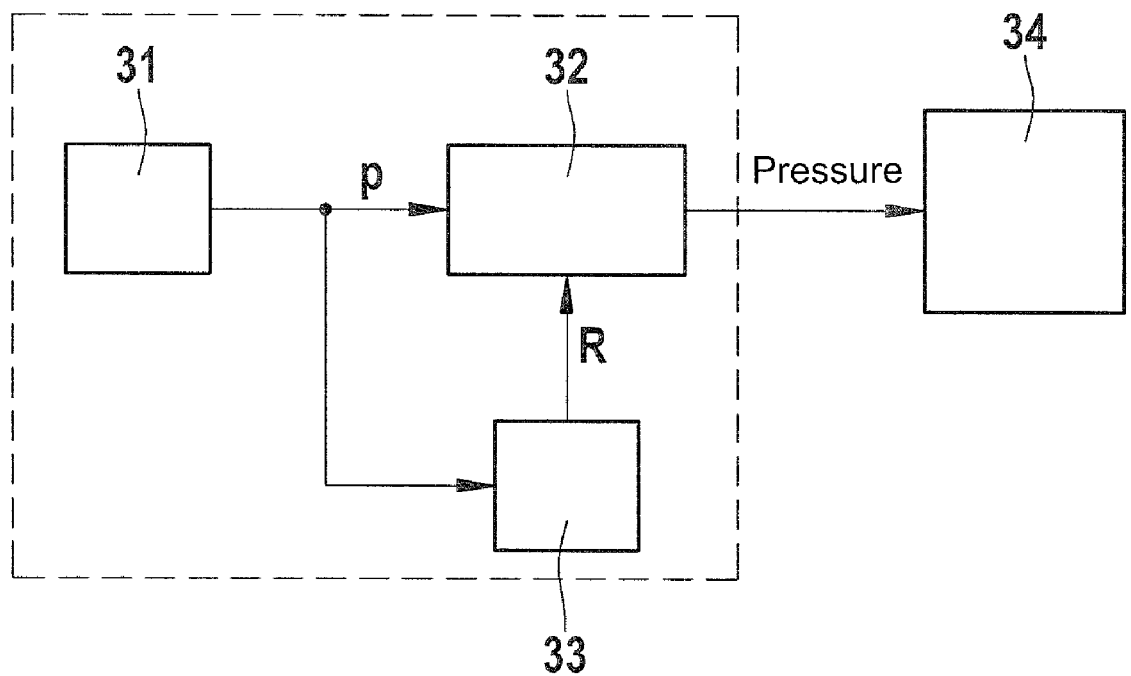
FIG. 3 is a view showing schematically a device according to the exemplary embodiment of the invention.

FIG. 2 schematically depicts the operating sequence of the method described above. FIG. 3 shows the device for executing it. The steps shown in FIG. 2 are executed in block 33 of FIG. 3. The reset time determined in block 33 is supplied in the form of signal R to the block 32 in which the drift compensation is executed. In block 32, in addition to the drift compensation, other steps for signal processing can also be carried out so that the signal "pressure" representing the combustion chamber pressure can be supplied to the engine control unit 34.

After the starting step 201, in step 202, the counter reading Z is set to the value zero. In step 203, the current output value p of the sensor 31 is read. If it is determined in step 204 that the pressure value p has not exceeded the threshold value S1, then the counter reading Z=0 is maintained and the pressure value p is updated in block 203.

But if it is determined in step 204 that the threshold value S1 has been exceeded, then the counter reading Z is increased by one in block 205. This increasing process continues until it is determined in block 206 that the pressure value p has exceeded the second threshold S2. If this is the case, then in block 207, the counter reading Z is multiplied by the applicable factor F_mult to obtain a new counter reading Z.

By means of the query in block 209, the counter reading is decreased in block 208 until the value zero has been reached.

If this is the case, and if the query in block 210 determines that the pressure value p has fallen below the threshold value S3, then in block 211, a reset is triggered and the signal R is transmitted to the block 32. After the ending step 212, the operating sequence shown in FIG. 2 is repeated.

It will be understood that each of the elements described above, or two or more together, may also find a useful application in other types of methods differing from the type described above.

While the invention has been illustrated and described as embodied in a method and device for determining the reset time and/or for drift compensation in a combustion chamber pressure sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for determining a reset time in a pressure sensor that detects a pressure in a combustion chamber of an internal combustion engine and emits a corresponding pressure signal, in which a pressure curve in the combustion chamber has at least one high-pressure region, the method comprising the steps of detecting at least one pressure value during a high-pressure phase; and determining a reset time as a function of the at least one pressure value detected during the high-pressure phase.

2. A method as defined in claim 1, wherein said determining the reset time includes determining the reset time in such a way that during the high-pressure region a time signal (t2-t1) is detected and the reset time is determined as a function of the time signal (t2-t1), t1 and t2 being time values corresponding by the pressure curve respectively to a first pressure threshold S1 and a second pressure threshold 82, the first and second predetermined thresholds S1 and S2 being predetermined in the high-pressure phase.

3. A method as defined in claim 2; and further comprising multiplying the detected time signal (t2-t1) by a factor (F_mult) at an additional time; said determining the reset time including determining the reset time after the pressure has reached the second pressure threshold S2 and the additional time has expires.

4. A method as defined in claim 2; and further comprising multiplying the detected time signal (t2-t1) by a factor (F_mult) at an additional time, said determining the reset time includes determining the reset time after the pressure has reached the second pressure threshold S2, the additional time has expired, and after the pressure has fallen below a third predetermined pressure threshold S3.

5. A method for drift compensation of a pressure sensor that detects a pressure in a combustion chamber of an internal combustion engine and emits a corresponding pressure signal, in which a pressure curve in the combustion chamber has at least one high-pressure region and a reset time is determined for the drift compensation, wherein the reset time is determined as a function of at least one pressure value detected during a compression phase.

6. A device for executing a method for determining a reset time in a pressure sensor that detects a pressure in a combustion chamber of an internal combustion engine having an engine control unit and emits a corresponding pressure signal, in which a pressure curve in the combustion chamber has at least one high-pressure region, the method including the steps of detecting at least one pressure value during a high pressure phase, and determining a reset time as a function of the at least one pressure value detected during a high-pressure phase, comprising:

at least one pressure sensor for detecting said pressure and emitting a pressure signal corresponding to the detected pressure;

means for determining said reset time based on the pressure signal received from the pressure sensor and emitting a signal R corresponding to the determined reset time; and means for processing the pressure signal received from the pressure sensor and the signal R into a combustion-chamber-pressure signal being supplied to the engine control unit.

7. A device for executing a method for pressure-sensor drift compensation in a combustion chamber of an internal combustion engine having an engine control unit, in which a pressure curve in the combustion chamber has at least one high-pressure region and a reset time is determined for the pressure-sensor drift compensation, wherein the reset time is determined as a function of at least one pressure value detected during a high-pressure phase, comprising:

at least one pressure sensor for detecting a pressure in the high-pressure phase and emitting a pressure signal corresponding to the detected pressure;

means for determining said reset time based on the pressure signal received from the pressure sensor and emitting a signal R corresponding to the determined reset time; and means for executing the pressure-sensor drift compensation based on the signal R into a signal being supplied to the engine control unit.

* * * * *